United States Patent
Nagao et al.

(10) Patent No.: US 6,940,404 B2
(45) Date of Patent: Sep. 6, 2005

(54) TRANSMITTER FOR SURVEILLANCE CAMERA, AND SURVEILLANCE SYSTEM

(75) Inventors: Mitsuyoshi Nagao, Fujieda (JP); Hidenori Sato, Fujieda (JP)

(73) Assignee: Murakami Corporation, Shizuoka (JP)

( * ) Notice: Subject to any disclaimer, the term of this patent is extended or adjusted under 35 U.S.C. 154(b) by 168 days.

(21) Appl. No.: 10/675,998

(22) Filed: Oct. 2, 2003

(65) Prior Publication Data

US 2004/0119820 A1 Jun. 24, 2004

(30) Foreign Application Priority Data

Oct. 18, 2002 (JP) ........................................ 2002-304023
Jun. 27, 2003 (JP) ........................................ 2003-185752

(51) Int. Cl.[7] .............................. G08B 1/08; H04Q 7/00
(52) U.S. Cl. .................. 340/539.25; 340/538; 340/506
(58) Field of Search ............................ 340/539.25, 538, 340/531, 506; 348/143, 14.05; 725/4, 149, 150

(56) References Cited

U.S. PATENT DOCUMENTS

| | | | | |
|---|---|---|---|---|
| 4,908,604 A | * | 3/1990 | Jacob ..................... | 340/539.16 |
| 5,382,943 A | * | 1/1995 | Tanaka .................... | 340/539.22 |
| 5,905,442 A | * | 5/1999 | Mosebrook et al. ......... | 340/3.7 |
| 6,400,265 B1 | * | 6/2002 | Saylor et al. ............... | 340/531 |
| 6,441,723 B1 | * | 8/2002 | Mansfield et al. ..... | 340/310.01 |
| 6,597,285 B2 | * | 7/2003 | Yamamoto et al. .......... | 340/3.1 |

FOREIGN PATENT DOCUMENTS

JP  20002-77893  3/2002

* cited by examiner

*Primary Examiner*—John Tweel, Jr.
(74) *Attorney, Agent, or Firm*—Oblon, Spivak, McClelland, Maier & Neustadt, P.C.

(57) ABSTRACT

An RF converter circuit 11 that constitutes a video signal superposing/power deriving unit 100 converts video signals generated from images taken by a surveillance camera 10, which derives a direct current voltage as a driving power from an antenna lead-in wire 6 through a filter circuit (LPF circuit 12), to radio-frequency signals. The radio-frequency signals are transmitted through the antenna lead-in wire 6 to a television receiver 2. Images taken by the surveillance camera 1 can be viewed on the television receiver 2 only by selecting the channel assigned to the surveillance camera 1. Accordingly, the driving power for the surveillance camera 1 is not relied upon a solar battery or secondary batteries, and wiring work therefor may be simplified.

15 Claims, 8 Drawing Sheets

TRANSMITTER FOR SURVEILLANCE CAMERA, AND SURVEILLANCE SYSTEM

BACKGROUND OF THE INVENTION

This invention relates to a transmitter for a surveillance camera, and a surveillance system, and more particularly to a transmitter for transmitting images taken by a surveillance camera to a television receiver.

Among prevailing transmitters for transmitting images taken by a surveillance camera to a television receiver are, typically, those which come with door camera systems and video door phone systems. Each of these systems employs a surveillance camera provided at a front door or the like for security purposes, and commonly includes a wired means of communication through which images taken by the surveillance camera are transmitted to the receiver and displayed on a monitor thereof. Accordingly, necessary wiring of a power cord and a video signal transmission line produces a burdensome wiring task, and rather finding room for the wiring is necessitated.

On the other hand, radio transmission techniques are disclosed, for example, in Japanese Laid-Open Patent Application, Publication No. 2002-77893, in which power is supplied from a solar battery as well as storage batteries, and images taken by a camera are transmitted through a wireless means of communication to a receiver and displayed on a monitor. The combination of the solar battery and the wireless signal transmission method as above would appear to eliminate the disadvantages derived from the wiring.

However, the aforementioned radio transmission techniques with a solar and storage battery power supply would produce practically nonnegligible expenses. Moreover, the use of the solar battery requires installation thereof in a location of sufficient solar irradiation, and the storage battery intrinsically has the problem of a limited life.

Meanwhile, in order to receive television broadcasting, the ordinary households are equipped with an antenna for receiving radio signals broadcast over airwaves; the radio signals are amplified by a booster installed outdoors, led into the house and distributed to a television receiver. Between the booster and the television receiver is provided a booster power supply that supplies the booster with a direct current through an extra channel superposed in a coaxial cable that is normally used as a lead-in for the antenna.

The present invention has been made with consideration given to the above circumstances, and it is an object of the present invention to provide a transmitter for a surveillance camera, and a surveillance system, which utilizes an antenna lead-in wire that has already been wired in ordinary households, and thereby obviates the need for employing a solar battery or storage batteries for power supply, and makes wiring task for installation simplified.

SUMMARY OF THE INVENTION

In one exemplified aspect of the present invention, there is provided a transmitter for a surveillance camera system, which transmits images taken by a surveillance camera to a television receiver. This transmitter includes a power deriving circuit and a radio-frequency converter circuit. The power deriving circuit derives driving power for the surveillance camera from an antenna lead-in wire. A radio-frequency converter circuit converts video signals generated from the above images by the surveillance camera into radio-frequency signals, whereby the radio-frequency signals corresponding to the images taken by the surveillance camera are transmitted through the antenna lead-in wire to the television receiver.

According to the present invention as above, first of all, the transmitter includes a power deriving circuit (e.g., a filter circuit such as a low-pass filter circuit) that derives driving power (direct current) for the surveillance camera from an antenna lead-in wire, and thus the existing antenna lead-in wire can be used for electric power supply wiring to the surveillance camera so that power supply for the booster can be used (doubled) as power supply for the surveillance camera. Consequently, the power supply wiring from the outside of the surveillance camera can be simplified. Further, the above transmitter needs no solar battery or storage batteries as driving power for the surveillance camera, and thus can be used in the shade, can save the need for replacement and maintenance of batteries, and is available at low cost.

Second, the radio-frequency converter circuit provided to convert video signals generated from images taken by the surveillance camera into radio-frequency signals which can be transmitted through the antenna lead-in wire to the television receiver, and can characteristically utilize the existing antenna lead-in wire for video signal transmission line from the surveillance camera to the television receiver. Thus, wiring for video signal transmission can be simplified, making the transmitter available at low cost.

According to the present invention as exemplified above, a very cost-efficient transmitter for a surveillance camera system, less expensive than a wireless system, is made available.

Hereupon, the term "radio-frequency signal(s)" is intended to indicate a high-frequency signal(s) transmitted from an antenna to a television receiver.

The above transmitter for a surveillance camera system may further be provided with a video signal superposing/power deriving unit, which includes the above radio-frequency converter circuit and the above power deriving circuit, separately from the surveillance camera, and the video signal superposing/power deriving unit is connected with the surveillance camera and the antenna lead-in wire, respectively.

According to this arrangement, since the video signal superposing/power deriving unit including the above radio-frequency converter circuit and the above power deriving circuit is provided separately from the surveillance camera, the transmitter for a surveillance camera system can be designed with a commonly available surveillance camera without adding new hardware in the surveillance camera, and can thus be constructed through a simplified process.

The video signal superposing/power deriving unit may preferably be connected with the antenna lead-in wire at a point between the booster and the booster power supply.

The above video signal superposing/power deriving unit may be provided in the surveillance camera.

Provision of the video signal superposing/power deriving unit in the surveillance camera would facilitate field wiring work, which can be achieved with perfect ease only by connecting the video signal superposing/power deriving unit contained in the surveillance camera with the antenna lead-in wire. Moreover, any separate video signal superposing/power deriving unit, which would need to be protected with a solid protective casing, is not required, and thus necessary cost can be reduced, accordingly.

In this arrangement where the video signal superposing/power deriving unit is provided in the surveillance camera, a terminal or connector for connecting with the antenna lead-in wire may preferably be provided at an appropriate position on a portion corresponding to an outer cover of the surveillance camera. For this purpose, an internal connection between the terminal or connector and the video signal superposing/power deriving unit should be established, in addition to an internal connection between the surveillance camera and the video signal superposing/power deriving unit. The terminal or connector and the portion where the connection is established may preferably be designed to be waterproof in a manner known in the art. The terminal or connector may preferably be connectable to a coaxial cable. The terminal or connector for a coaxial cable, once connected to such a coaxial cable, can be used to complete a simplified wiring work only by connecting the coaxial cable to the antenna lead-in wire.

The above surveillance camera system may include a plurality of surveillance cameras; i.e., the transmitter for such a surveillance camera system may transmit images taken by a plurality of the surveillance cameras to one or more television receivers. The transmitter includes a plurality of power deriving circuits and a plurality of radio-frequency converter circuits similar to the arrangement as described above. To be more specific, the power deriving circuits each derive driving power for corresponding one of the surveillance cameras from an antenna lead-in wire. The radio-frequency converter circuits each convert video signals generated from the images taken by a corresponding one of the surveillance cameras into radio-frequency signals, whereby the radio-frequency signals corresponding to the images taken by each of the surveillance cameras are transmitted through the antenna lead-in wire to the television receivers. In this arrangement, radio-frequency signals from each surveillance camera are different in frequency band from those from every other surveillance camera, so that a different channel of the television receivers is assigned to the radio-frequency signals from each surveillance camera.

According to this arrangement in which video signals generated from images taken by each surveillance camera are converted into radio-frequency signals by one of the radio-frequency converter circuits corresponding to the surveillance camera, the video signals from each surveillance camera are each assigned to a different channel of the television receivers. In other words, video signals from one surveillance camera are converted into radio-frequency signals different from those into which video signals from another surveillance camera are converted so that channels of each television receiver for radio-frequency signals converted from one surveillance camera are not identical with those for radio-frequency signals converted from another surveillance camera. Consequently, images taken by any one of the surveillance cameras can be viewed on each television receiver by selecting one of the channels corresponding to the surveillance camera. Even when a plurality of surveillance cameras are provided, the video signal superposing/power deriving unit may be provided for each surveillance camera. Each video signal superposing/power deriving unit may be provided separately from the corresponding surveillance camera or within the corresponding surveillance camera.

The transmitter for a surveillance camera as described above may further include a detection unit that detects a significant change in a location under surveillance; and a notification unit that notifies a television viewer of detection of the significant change when the detection takes place.

In this arrangement where the notification unit notifies a television viewer or audience that a significant change in a location under surveillance, such as an approach of someone, etc., is detected, when the detection unit detects such a significant change, a person who watches a broadcast TV program is alarmed upon detection of such a significant change as occurrence of abnormal conditions, so that he/she can switch, only when alarmed, from the channel for the TV program to the channel for the surveillance camera corresponding to the detection unit that has just detected the abnormal conditions, to observe the location where someone is approaching. If a plurality of surveillance cameras are provided in the surveillance camera system, the above detection unit and notification unit may be provided for each surveillance camera.

In another exemplified aspect of the present invention, a video signal superposing/power deriving unit includes: a power deriving circuit that derives driving power for a surveillance camera from an antenna lead-in wire; and a radio-frequency converter circuit that converts video signals generated by the surveillance camera into radio-frequency signals, wherein the radio-frequency signals corresponding to the images taken by the surveillance camera are transmitted through the antenna lead-in wire to the television receiver.

Fabrication and use of such a video signal superposing/power deriving unit enables the utilization of the antenna lead-in wire as a signal transmission line and a power code, serving to simplify the wiring work.

In every aspect of the present invention, two or more television receivers may be connected to the surveillance camera system, whereby all the connected television receivers can serve as a TV monitor on as required basis, enhancing security functionality in the house.

The transmitter for a surveillance camera system as described above may further include a power supply control circuit that permits power supply to the surveillance camera and transmission of radio-frequency signals to the television receiver when a significant change in a location under surveillance is detected.

With this arrangement, since the power supply control circuit is adapted to permit power supply to the surveillance camera and transmission of radio-frequency signals to the television receiver when a significant change in a location under surveillance (e.g., approach of someone, etc.), the transmitter for a surveillance camera system can be provided without using the costly image-processing techniques, and thus at low cost.

In yet another exemplified aspect of the present invention, there is provided a surveillance system which includes a surveillance camera, a radio-frequency converter circuit, and a power supply control circuit. The surveillance camera uses as driving power a direct current voltage derived by a filter circuit from an antenna lead-in wire to take images to be transmitted to a television receiver. The radio-frequency converter circuit converts video signals generated from the images by the surveillance camera into radio-frequency signals, and the radio-frequency signals corresponding to the images taken by the surveillance camera are transmitted through the antenna lead-in wire to the television receiver. The power supply control circuit permits power supply to the surveillance camera and transmission of radio-frequency signals to the television receiver when a significant change in a location under surveillance is detected.

According to this surveillance system, when a significant change in a location under surveillance (e.g., approach of someone, etc.), the power supply control circuit supplies driving power to the surveillance camera and allows the radio-frequency signals to be transmitted to the television receiver. Therefore, the surveillance system can be provided without using the costly image-processing techniques, and thus at low cost. Moreover, the surveillance camera uses as driving power a direct current voltage derived by the filter circuit from the antenna lead-in wire, and the radio-frequency converter circuit converts the video signals generated by the surveillance camera into radio-frequency signals to be transmitted through the antenna lead-in line to the television receiver. Consequently, By making use of the antenna lead-in wire, the booster power supply can be utilized for the driving power source of the surveillance camera, and a new video signal transmission line is not required to construct the surveillance system; thus, no solar battery or storage batteries as driving power for the surveillance camera is required, and wiring for video signal transmission can be simplified, making the system available at low cost. Consequently, a very cost-efficient surveillance system, less expensive than a wireless system, is made available.

In the above surveillance system, the power supply control circuit may include a sensor circuit, a filter circuit, and a switching circuit. The sensor circuit detects a significant change in a location under surveillance. The filter circuit derives the direct current voltage from a channel superposed in the antenna lead-in wire and supplies the same to the sensor circuit. The switching circuit starts the power supply to the surveillance camera and the transmission of radio-frequency signals to the television receiver when the sensor circuit detects a significant change in a location under surveillance.

With this arrangement, detection of an approach of a trespasser, a visitor or others can be made, for example, by an infrared sensor, and the filter circuit such as a low-pass filter is always ready to supply power (direct current) derived from a channel superposed in the antenna lead-in wire to the surveillance camera. Therefore, the power supply to the surveillance camera and the transmission of video signals from the surveillance camera to a household television receiver are enabled only when an approach of a trespasser, a visitor or others is detected by the sensor. Consequently, the surveillance system can be provided without using the costly image-processing techniques, and thus at low cost.

According to yet another exemplified aspect of the present invention, a surveillance system may include: a plurality of surveillance cameras that each use as driving power a direct current voltage derived by a filter circuit from an antenna lead-in wire to take images to be transmitted to a television receiver; a radio-frequency converter circuit that converts video signals generated from the images by the surveillance cameras into radio-frequency signals, wherein the radio-frequency signals corresponding to the images taken by the surveillance cameras are transmitted through the antenna lead-in wire to the television receiver; a power supply control circuit that permits power supply to each of the surveillance cameras and transmission of radio-frequency signals to the television receiver when a significant change in each location under surveillance is detected; and a warning generation device that receives the radio-frequency signals, evaluates a level of radio-frequency signals for each channel corresponding to each of the surveillance camera, and generates a warning.

In this arrangement, the warning generation device receives radio-frequency signals through an antenna lead-in wire, evaluates the level of the radio-frequency signals for each channel corresponding to each of the surveillance cameras, and video signals are transmitted to the television receiver or an indicator is displayed or an alarm is set off. Therefore, the surveillance system can be provided without using the costly image-processing techniques, and thus at low cost.

In the above surveillance system, the warning generation device may include: a signal level determination circuit that is provided for each channel to evaluate the level of the radio-frequency signals for the channel inputted through a filter provided for each level of the radio-frequency signals; and a warning generation circuit that is provided for each signal level determination circuit to generate a warning when radio-frequency signals having the level corresponding to the signal level determination circuit are inputted.

With this arrangement, video signals are converted into radio-frequency signals for each channel and transmitted through an antenna lead-in wire, and thus two or more surveillance cameras may be connected with the surveillance system, and two or more television receivers may be connected to the surveillance system, whereby all the connected television receivers can serve as a TV monitor on as required basis, enhancing security functionality in the house. Moreover, the output of video signals takes place only upon detection of an approach of a trespasser, a visitor or others, and the level of the radio-frequency signals is determined to assign the signal to a channel so that a warning is issued for each channel. Accordingly, even while watching an ordinary TV program, a user is notified of an approach of a trespasser or visitor, and thus can timely view images under surveillance as necessary with ease just by switching channels.

In the above surveillance system, the warning generation device may include: a signal level determination circuit that evaluates the level of the radio-frequency signals inputted through a variable frequency filter; a channel scanning circuit that determines a channel corresponding to the level of the radio-frequency signals; one or more of warning generation circuits that is provided for each channel to generate a warning when receiving the radio-frequency signals; and a selector that receives determination results of the signal determination circuit and the channel scanning circuit, and supplies the output of the signal determination circuit to at least one of the warning generation circuits corresponding to the channel.

According to this arrangement, particular advantages, other than those as described above, are that the number of the signal level determination circuit can be saved to only one, and the number of the filter circuit that used to be provided for each channel can be only one, too. The number of components of the system can be saved, and resultantly the surveillance systems can be provided at lower cost.

Other objects and further features of the present invention will become readily apparent from the following description of preferred embodiments with reference to accompanying drawings.

DETAILED DESCRIPTION OF THE PREFERRED EMBODIMENTS

A description will be given of one exemplified embodiment of a transmitter for a surveillance camera system according to the present invention with reference to FIG. 1.

Figure 1:
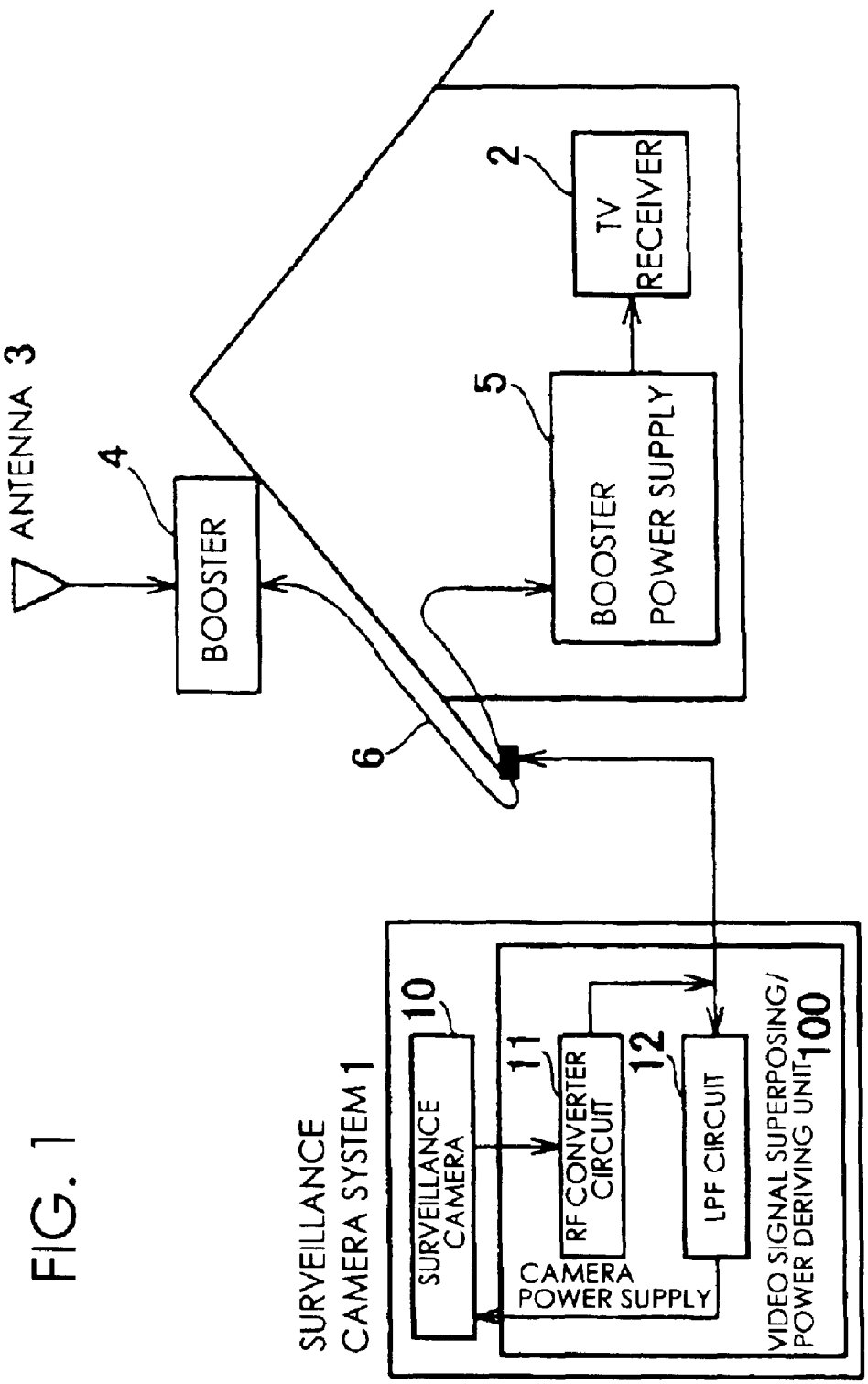
FIG. 1 is a block diagram showing one exemplary embodiment of a transmitter for a surveillance camera system according to the present invention.

In FIG. 1, denoted by 1 is a surveillance camera system, and denoted by 2 is a television receiver (TV set) in common use in ordinary households. In the ordinary households, for the purpose of watching TV, an antenna 3 is provided to receive signals broadcast over airwaves, which are amplified by a booster 4 installed outdoors, led into the house and distributed to the television receiver 2. A booster power supply 5 is provided between the booster 4 and the television receiver 2, and serves to supply the booster 4 with power (direct current) through an extra channel superposed in a coaxial cable 6 that is normally provided as an antenna lead-in wire.

The surveillance camera system 1 includes a surveillance camera 10 and a video signal superposing/power deriving unit (circuit) 100.

The video signal superposing/power deriving unit 100 includes an RF (radio-frequency) converter circuit 11 that converts NTSC (National Television System Committee Standard) video signals generated by the surveillance camera 10 from images taken by the surveillance camera 10 into radio-frequency or RF signals transmittible between the antenna 3 and the television receiver 2, and an LPF (low-pass filter) circuit 12 that takes out a direct-current voltage from the channel superposed in the coaxial cable 6 and utilizes the direct-current voltage as power supply for the surveillance camera system 1.

Hereupon, the RF signals (radio-frequency signals) are high-frequency signals that transmit from the antenna 3 to the television receiver 2.

According to the above arrangement, power supply for the surveillance camera can be derived from the existing power supply for the booster through the LPF circuit 12 of the video signal superposing/power deriving unit 100 without requiring other costly power sources such as a solar battery or secondary batteries, with the result that the transmitter for a surveillance camera system is provided with advantageous features that can obviate the need for replacement and maintenance of batteries.

Moreover, since the only cable to be connected with the surveillance camera system 1 is a coaxial cable connected to the antenna lead-in wire 6, with no other cable required, no extra work for making a hole in a wall of the house to establish connection with the surveillance camera system 1 or the like is necessitated. A user can observe images taken by the surveillance camera system 1 on TV (television receiver 2) in the home, only by calling up a channel corresponding to the video signals transmitted from the surveillance camera system 1. In homes equipped with two or more surveillance cameras 10 and two or more television receivers 2, images taken by all the surveillance cameras 10 can be observed on all the television receivers 2 connected to the antenna lead-in wire 6.

Figure 2:
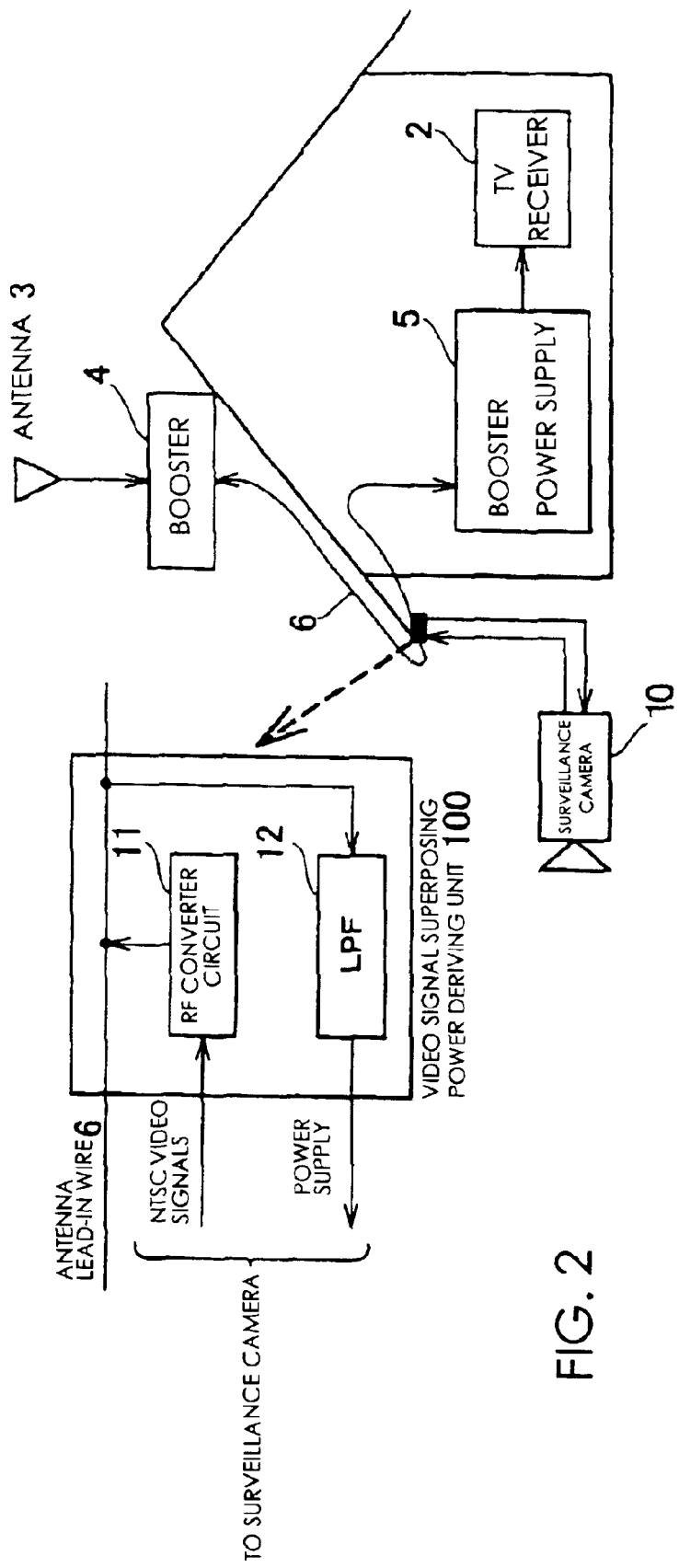
FIG. 2 is a block diagram showing another exemplary embodiment of a transmitter for a surveillance camera system according to the present invention.

Referring now to FIG. 2, another exemplified embodiment of the surveillance camera system according to the present invention will be described.

In FIG. 2, those blocks designated by the same reference numerals or symbols as in FIG. 1 should be deemed to be identical with the blocks of FIG. 1.

The difference between this embodiment and the embodiment as illustrated in FIG. 1 is in a video signal superposing/power deriving unit 100 that is arranged as a separate unit (separate module) provided separately from a surveillance camera 10. The video signal superposing/power deriving unit 100 is connected to an antenna lead-in wire 6 between a booster 4 and a booster power supply 5 via a coaxial cable.

In this instance, a commercially available CCD camera may be employed for the surveillance camera 10. NTSC video signals generated in the surveillance camera 10 are transmitted to the video signal superposing/power deriving unit 100, and the NTSC signals are converted into radio-frequency signals by an RF converter circuit 11 included in the video signal superposing/power deriving unit 100 and outputted through a channel superposed in the antenna lead-in wire 6.

An LPF circuit 12 included in the video signal superposing/power deriving unit 100 derives a direct-current voltage superposed in the antenna lead-in wire 6, and supplies the surveillance camera 10 with the direct-current voltage as power supply.

According to the above arrangement, advantageously, images taken by the surveillance camera system 1 can be observed on TV (television receiver 2) in the home, only by calling up a channel corresponding to the video signals transmitted from the surveillance camera system 1. Another advantageous effect of the present embodiment is that a commercially available ordinary camera can be used as the surveillance camera 10. In homes equipped with two or more surveillance cameras 10 and two or more television receivers 2, images taken by all the surveillance cameras 10 can be observed on all the television receivers 2 connected to the antenna lead-in wire 6.

A description will now be given of yet another exemplary embodiment of the transmitter for a surveillance camera system according to the present invention with reference to FIG. 3.

Figure 3:
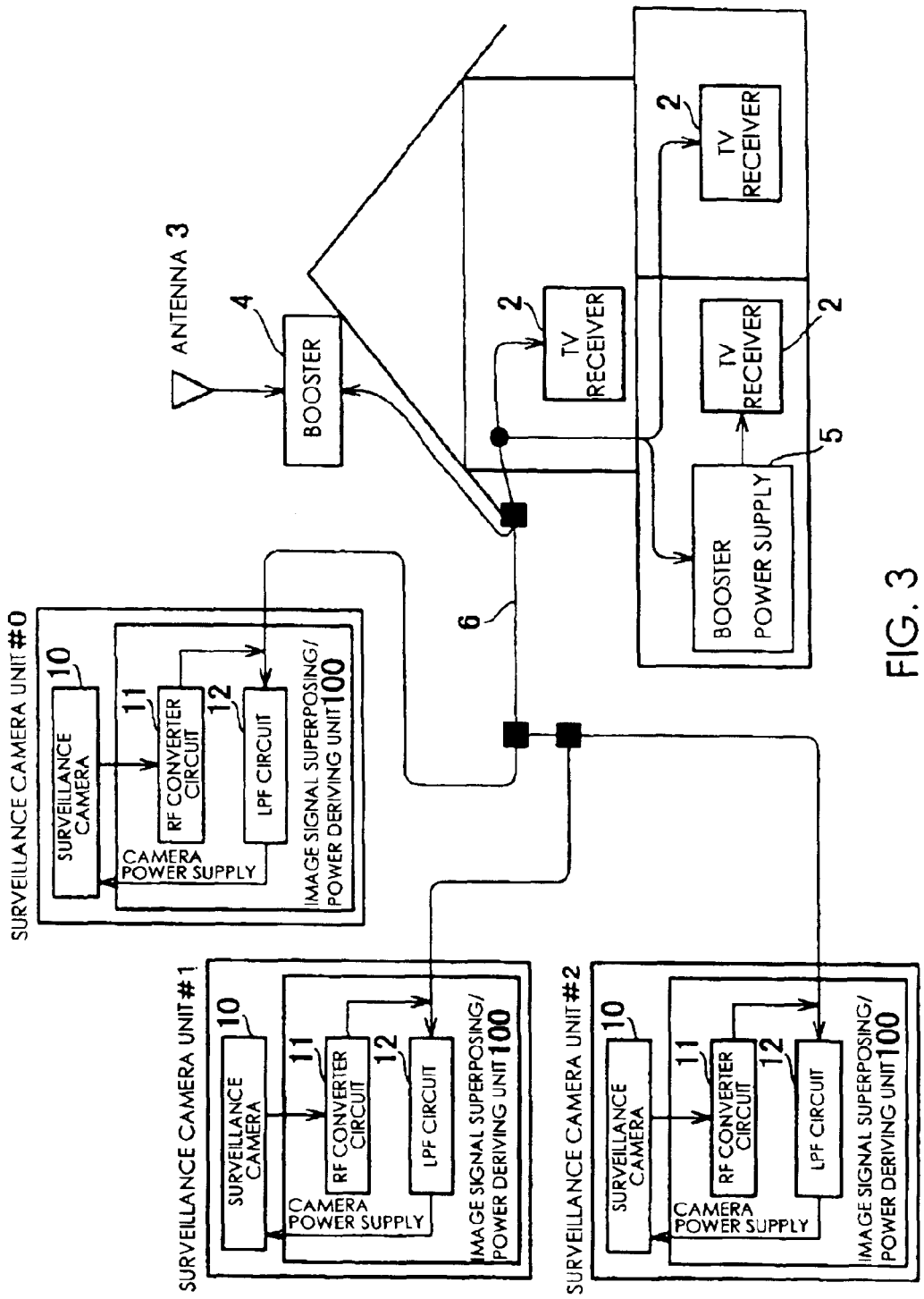
FIG. 3 is a block diagram showing yet another exemplary embodiment of a transmitter for a surveillance camera system according to the present invention.

In FIG. 3, those blocks designated by the same reference numerals or symbols as in FIG. 1 should be deemed to be identical with the blocks of FIG. 1.

This embodiment exemplifies the use of a plurality of surveillance camera units #0–#2 each having the same construction as the surveillance camera system 1 of FIG. 1. In order to make a plurality of surveillance camera units #0–#2 available in the surveillance camera system 1, video signals generated from images taken by each surveillance camera 10 are converted into radio-frequency signals by the RF converter circuit 11 of the corresponding video signal superposing/power deriving unit 100 so that radio-frequency signals from each surveillance camera 10 can be displayed on television receivers 2 and observed through a corresponding uniquely-assigned channel of the television receivers 2. In this instance, channels No. 13, 14 and 15 are assigned, for example, to the video signals from the surveillance camera units #0, #1 and #2, but any available channels may be assigned. This configuration allows a user to observe images taken by any one of the surveillance cameras on each television receiver 2 by selecting one of the channels corresponding to the surveillance camera. It is understood that any television receivers 2, if connected to the antenna lead-in wire 6, can be used to observe images from any one of the surveillance cameras 10.

In the drawings, solid filled rectangles denote distributors. This embodiment illustrated in FIG. 3 exemplifies an arrangement where the video signal superposing/power deriving units 100 are each included in the corresponding surveillance camera units #0–#2, but the same may be applied to another arrangement as illustrated in FIG. 2 where the video signal superposing/power deriving unit(s) 100 are provided as a separate module independent of the surveillance camera(s) 10.

Figure 4:
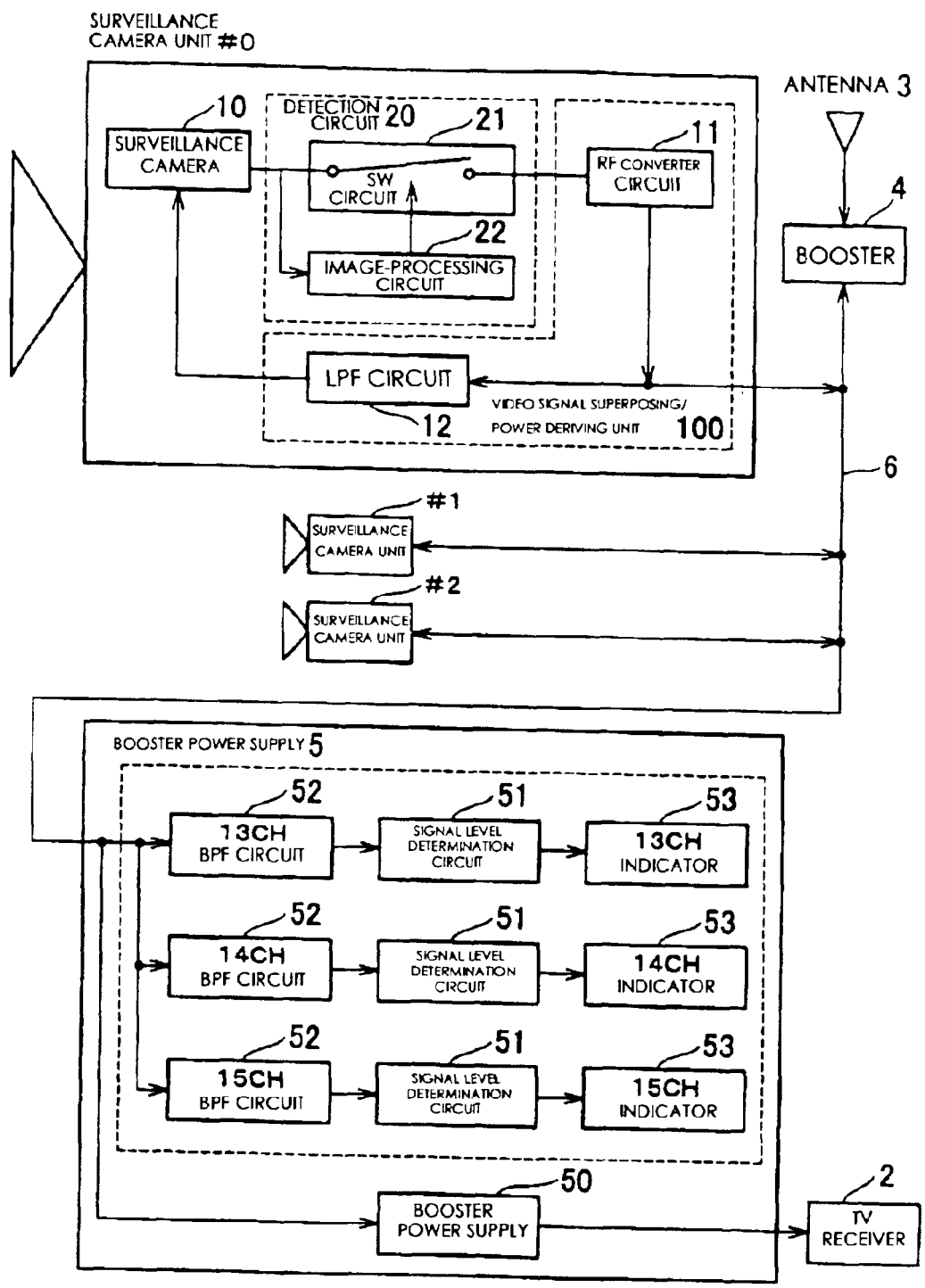
FIG. 4 is a block diagram showing yet another exemplary embodiment of a transmitter for a surveillance camera system according to the present invention.

Turning to FIG. 4, a description will be given of yet another exemplary embodiment of the transmitter for a surveillance camera system according to the present invention.

In FIG. 4, those blocks designated by the same reference numerals or symbols as in FIG. 3 should be deemed to be identical with the blocks of FIG. 3.

The difference between this embodiment and the embodiment as illustrated in FIG. 3 is in a detection circuit 20 that is additionally provided in each surveillance camera unit #0–#2 (detailed illustration is given for unit #0 only) to detect an approach of a trespasser, a visitor or others. The detection unit 20 uses an image processing circuit 22 to determine whether an input image is different from the preceding images. In other words, the detection circuit 20 detects a significant change in a location under surveillance. More specifically, the detection circuit 20 detects an approach of a trespasser, a visitor or others, and only if such detection occurs, transmits a detection signal to a SW (switching) circuit 21 and turns on the switch (SW), so that video signals are outputted only upon detection of an approach of a trespasser, a visitor or others.

Video signals outputted via the SW circuit 21 from each surveillance camera unit #0–#2 are superposed in the antenna lead-in wire 6 through the video signal superposing/power deriving unit 100.

On the other hand, in the booster power supply 5, also additionally provided is a signal level determination circuit 51 for each channel. The signal level determination circuit 51 determines for each channel whether video signals are inputted through a BPF (band-pass filter) circuit 52, and only if determining so, turns on an indicator 53 as a warning generation circuit (notification unit). Instead of the indicator 53 that visually gives a warning, an alarm that aurally gives a warning may be used as the warning generation circuit.

According to the above arrangement, even while watching an ordinary broadcast TV program, a user can switch channels, after alarmed by the indicator 53 or the like, so that he/she can observe images taken by the surveillance camera 10.

In the above arrangement, instead of the image processing circuit 22, an infrared sensor or pyroelectric sensor may be used to detect an approach of a trespasser, a visitor or others (a significant change in a location under surveillance), and then output a detection signal to turn on the SW in the SW circuit 21. A detailed description of alternative embodiments utilizing a sensor (sensing circuit) will be given later with reference to FIGS. 6–8.

Figure 5:
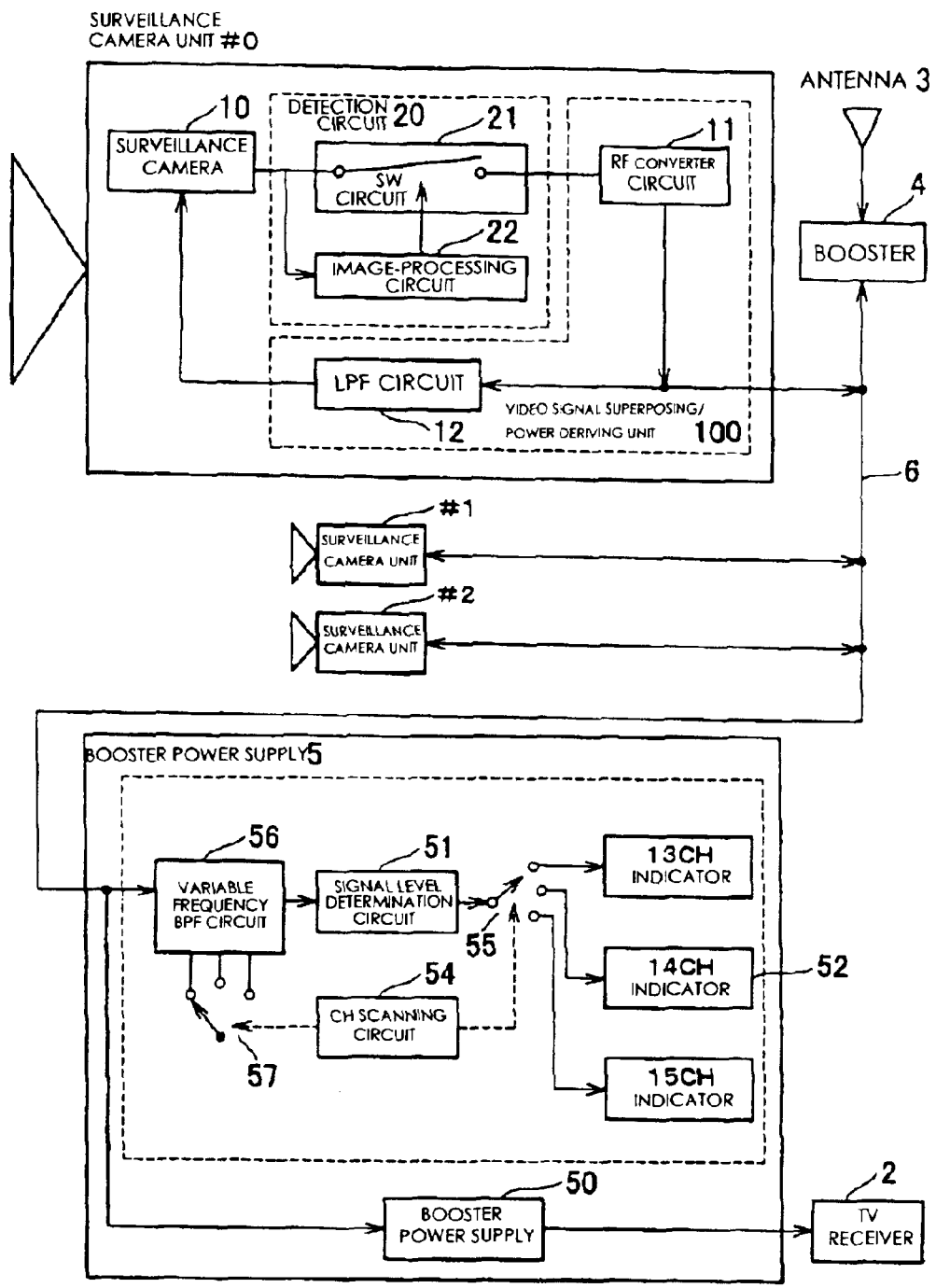
FIG. 5 is a block diagram showing yet another exemplary embodiment of a transmitter for a surveillance camera system according to the present invention.

Referring now to FIG. 5, a description will be given of yet another exemplary embodiment of the transmitter for a surveillance camera system.

In FIG. 5, those blocks designated by the same reference numerals or symbols as in FIG. 4 should be deemed to be identical with the blocks of FIG. 4.

The difference between this embodiment and the embodiment as illustrated in FIG. 4 is in provision of a channel (CH) scanning circuit 54 and a selector 55 that may eliminate the need for more than one of the signal level determination circuit 51, which is required for each channel in the booster power supply 5 according to the embodiment of FIG. 4. In this embodiment, as shown in FIG. 5, only one signal level determination circuit 51 is provided even though a plurality of the surveillance camera units #0–#2 are provided. Similarly, the BPF circuit 52, which is provided for each channel available in the above embodiment of FIG. 4, is substituted with one variable frequency BPF circuit 56 and a selector 57.

According to this embodiment, NTSC video signals outputted via the SW circuit 21 from each surveillance camera unit #0–#2 only when an approach of a trespasser, a visitor or others is detected are converted into radio-frequency signals through the video signal superposing/power deriving unit 100, and superposed in the antenna lead-in wire 6. The radio-frequency signals are scanned by the CH scanning circuit 54, and radio-frequency signals corresponding to a channel selected by the selector 57 are transmitted through the variable frequency BPF circuit 56 to the signal level determination circuit 51. If the signal level determination circuit 51 detects a predetermined level of signals, the indicator 52 corresponding to the channel is turned on using the selector 55 to issue a warning.

This arrangement, like the embodiment of FIG. 4, allows a user to switch channels in response to a warning, even while watching an ordinary broadcast TV program, to observe images taken by one of a plurality of the surveillance cameras 10.

Although the whole arrangement is not illustrated in a separate drawing figure, the video signal superposing/power deriving unit 100 as in the embodiment of FIG. 2 may be additionally provided with a detection circuit 20, and be connected between the surveillance camera units #0–#2 and the antenna lead-in wire 6, or included in the booster power supply 5, so that commercially available ordinary cameras can be employed as the surveillance camera units #0–#2.

As described above, the present invention utilizes the existing antenna lead-in wire that has already been wired in ordinary households, and thereby obviates the need for employing a solar battery or storage batteries for power supply, making wiring task for installation simplified, so that an inexpensive and maintenance-free transmitter for a surveillance camera system can be achieved.

The embodiments as described above with reference to FIGS. 4 and 5 are adapted to provide video signals only upon detection of an approach of a trespasser, a visitor or others (a significant change in a location under surveillance), and the detection is based upon an image-processing technique that is intricate, expensive, and may thus be difficult to practice in a household appliance under present circumstances. Therefore, referring to FIGS. 6 through 8, alternative embodiments of the transmitter for a surveillance camera system, and a surveillance system, according to the present invention will be described below which can transmit video signals to television receivers placed in the house upon detection of an approach of a trespasser, a visitor or others and can be implemented at low cost.

Figure 6:
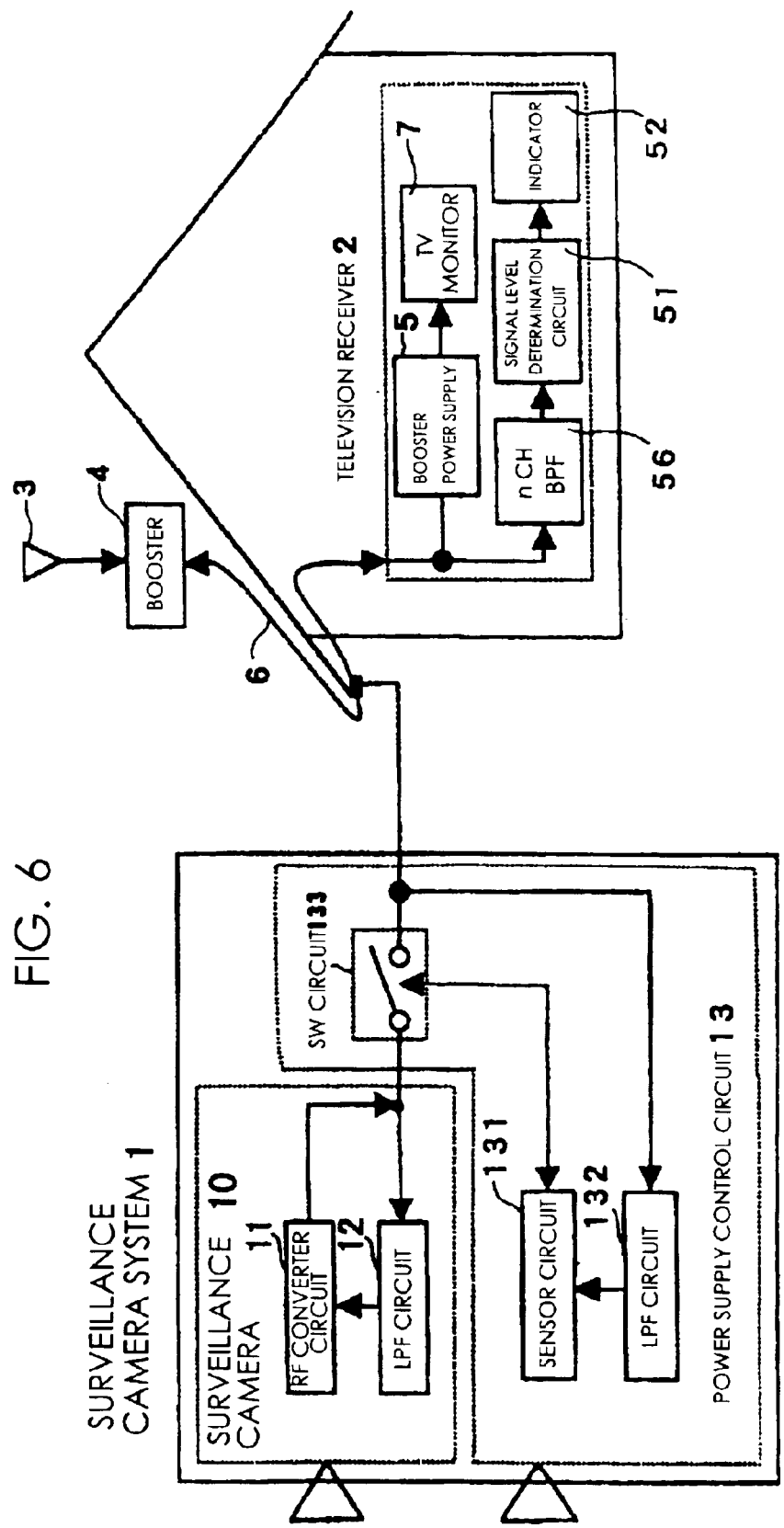
FIG. 6 is a block diagram showing one exemplary embodiment of a surveillance system according to the present invention.

In FIG. 6, denoted by 1 is a surveillance camera system, and denoted by 2 is a television receiver (TV set in common use in ordinary households with other components for the surveillance system, etc incorporated). In the ordinary households, for the purpose of watching TV, an antenna 3 is provided to receive signals broadcast over airwaves, which are amplified by a booster 4 installed outdoors, led into the house and distributed to the television receiver 2. A booster power supply 5 is provided between the booster 4 and the television receiver 2, and serves to supply the booster 4 with power (direct current) through an extra channel superposed in a coaxial cable 6 that is normally provided as an antenna lead-in wire. The coaxial cable 6 will be referred to as antenna lead-in wire 6 unless otherwise specified. In this embodiment, the television receiver 2 as illustrated in FIG. 6 will be described later in detail incorporating the booster power supply 5 and other components 51, 52, 56 of the surveillance system, as well as a TV monitor 7.

The surveillance camera system 1 includes a surveillance camera 10 and a power supply control circuit 13.

The surveillance camera 10 is a unit that includes not only a camera comprised of CCDs (Charge Coupled Devices) but also an RF converter circuit 11 that converts NTSC video signals taken and generated by the CCDs into RF signals transmittible between the antenna 3 and the television receiver 2, and an LPF (low-pass filter) circuit 12 that takes out a direct-current voltage from the channel superposed in the antenna lead-in wire 6 and utilizes the direct-current voltage as power supply for the surveillance camera system 1.

Hereupon, the RF signal (radio-frequency signal) refers to a composite picture signal consisting of a NTSC video signal and synchronizing signals, which transmits between the antenna 3 and the television receiver 2.

The power supply control circuit 13 includes a sensing circuit 131 and an LPF circuit 132, and a switching (SW) circuit 133.

The sensing circuit 131 is a sensor for detecting an approach of a trespasser, a visitor or others (a significant change in a location under surveillance), and comprised of an infrared sensor or pyroelectric sensor. The LPF circuit 132 is a low-pass filter that derives a direct-current voltage from the channel superposed in the antenna lead-in wire 6 and supplies the direct-current voltage to the sensing circuit 131. The SW circuit 133 enables power supply to the surveillance camera 10 and transmission of RF signals to the television receiver 2 when the sensing circuit 131 detects an approach of a trespasser, visitor or others.

The power supply control circuit 13 is configured to be ready to supply a direct-current voltage anytime from the channel superposed in the antenna lead-in wire 6 by means of the LPF circuit 132, and when a approach of a trespasser, visitor or others is detected, a detection signal from the sensing circuit 131 turns on the SW circuit 133 to supply a direct-current voltage to the surveillance camera 10 and transmit RF signals to the television receiver 2.

The television receiver 2 includes a BPF (band-pass filter) circuit 56 for each channel available (a description will be given later), a signal level determination circuit 51, and an indicator 52, as well as a booster power supply 5 and a TV monitor 7. The indicator 52 is configured to issue a warning only when an approach of a trespasser, visitor or others is detected and a detection signal is output from the sensing circuit 131. Alternatively, the television receiver 2 may be configured to display the trespasser, visitor or others that has approached in a location under surveillance, without warning with the indicator 52, upon receipt of a detection signal thereof. A detailed description will be given later.

According to this embodiment, a trespasser or visitor can be timely observed with a household TV set without using the state-of-the-art image-processing technique, and thus the system can be constructed at low cost. No cable is required to construct the system except one coaxial cable connected to the surveillance camera system 1; therefore, no extra work for making a hole in a wall of the house is necessitated. A user can observe images taken by the surveillance camera system 1 on TV (TV monitor 7 of the television receiver 2) in the home, only by calling up a channel corresponding to the video signals transmitted from the surveillance camera system 1.

Figure 7:
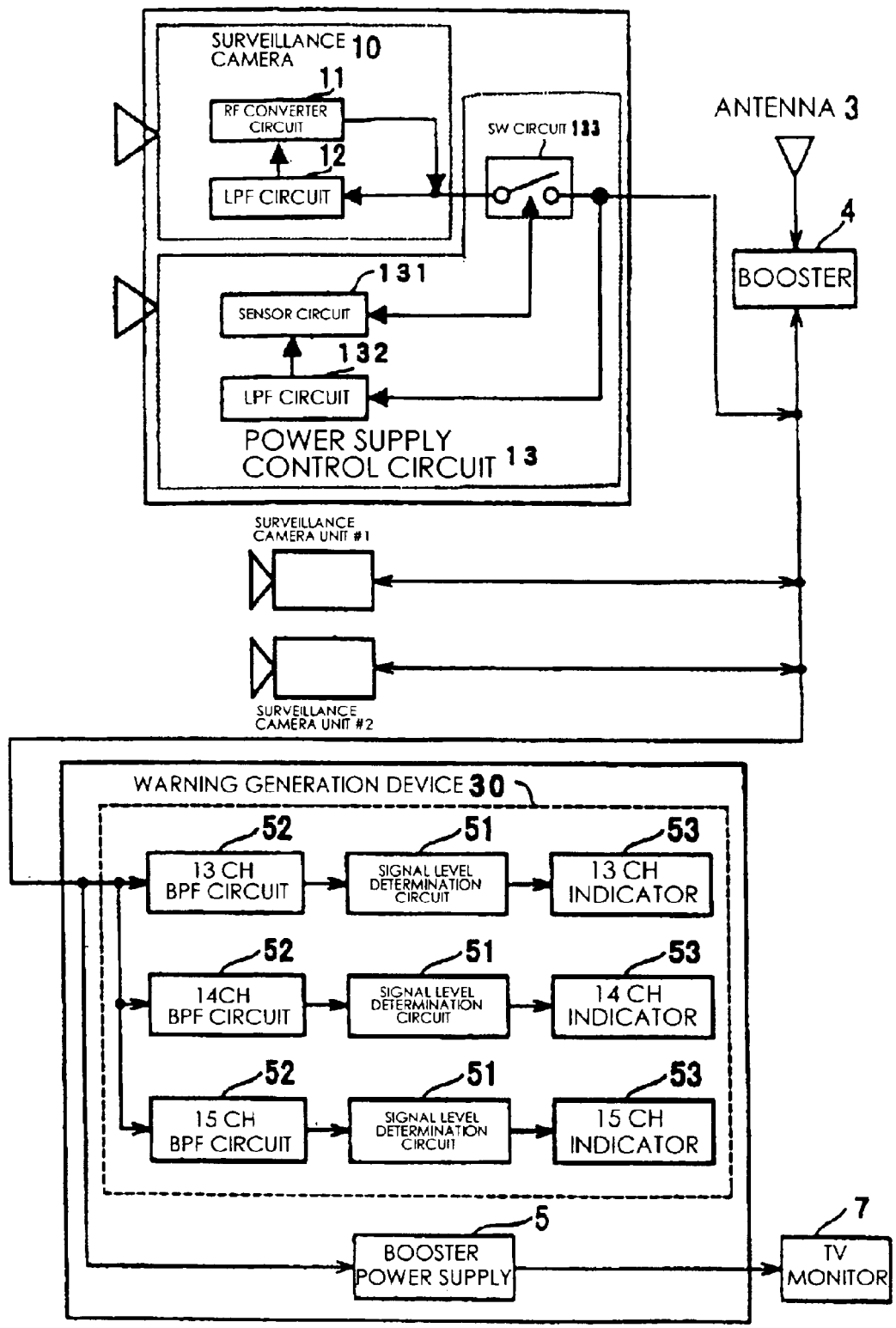
FIG. 7 is a block diagram showing another exemplary embodiment of the surveillance system according to the present invention.

Turning to FIG. 7, one exemplified embodiment of a surveillance system according to the present invention will be described.

In FIG. 7, those blocks designated by the same reference numerals or symbols as in FIG. 6 should be deemed to be identical with the blocks of FIG. 6. This embodiment exemplifies a surveillance system in which three surveillance camera units #0–#2 are provided, and a single set of the television receiver 2 is used to observe three locations under surveillance.

The surveillance system according to the present embodiment uses the transmitter for the surveillance camera system 1 as illustrated in FIG. 6. A warning generation device 30 is provided in the television receiver 2 to detect the output of signals from the surveillance camera units #0–#2 and upon detection, output the signals to the TV monitor 7 or give a warning through the indicator 52 corresponding to the channel provided for each surveillance camera unit #0–2. The warning presented by the indicator 52 may be an aural alarm instead of a visual indication.

To be more specific, video signals generated in each surveillance camera unit #0–2 are input to each RF converter circuit 11 in which the video signals are converted to RF signals, and only when an approach of a trespasser, visitor or others is detected, the converted RF signals are transmitted via the switching circuit 133, through a channel superposed in the antenna lead-in wire 6, to the television receiver 2.

In the television receiver 2 is provided signal level determination circuits 51 for respective channels corresponding to the surveillance camera units #0–#2, in addition are to the booster power supply 5, so that each of the corresponding indicators 53 is turned on only when video signals corresponding to the channel thereof is input. At this stage, the indicators 53 may be substituted with means for setting off an alarm.

The arrangement according to this embodiment allows a user to switch channels in response to a warning as necessary, even while watching an ordinary broadcast TV program, to observe images taken by one of the surveillance cameras units #0–#2.

Figure 8:
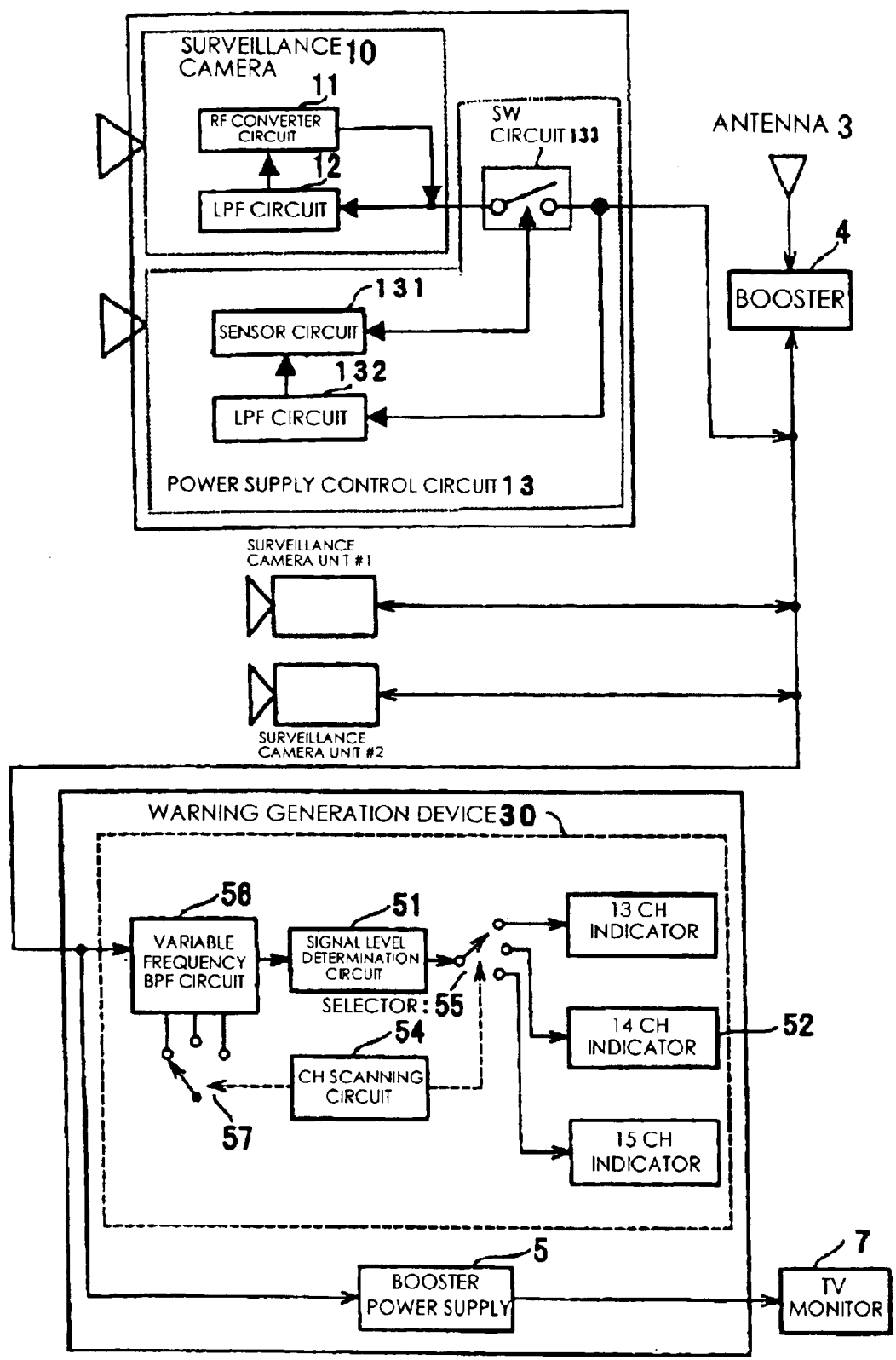
FIG. 8 is a block diagram showing yet another exemplary embodiment of the surveillance system according to the present invention.

FIG. 8 is a block diagram showing one exemplified embodiment of a surveillance system according to the present invention. In FIG. 8, those blocks designated by the same reference numerals or symbols as in FIG. 7 should be deemed to be identical with the blocks of FIG. 7.

The difference between this embodiment and the embodiment as illustrated in FIG. 7 is in provision of a channel (CH) scanning circuit 54 and a selector 55 that may eliminate the need for more than one of the signal level determination circuits 51, which is required for each channel in the warning generation device 30 provided in the television receiver 2 according to the embodiment of FIG. 7. In this embodiment, as shown in FIG. 8, only one signal level determination circuit 50 is provided even though a plurality of the surveillance camera units #0–#2 are provided. Similarly, the BPF circuit 52, which is provided for each channel available in the above embodiment of FIG. 7, is substituted with one variable frequency BPF circuit 56 and a selector 57.

In operation, the levels of the RF signals input via the variable frequency BPF circuit 56 are determined in one and the same signal level determination circuit 50. The output of the signal level determination circuit 50 is supplied to the selector 57, while one of the indicators 91–93 each provided for corresponding channels is turned on based upon determination of the channel corresponding to the frequency made in the CH scanning circuit 54, to issue a warning.

The arrangement according to this embodiment, like the embodiment as shown in FIGS. 2 and 7, allows a user to switch channels in response to a warning as necessary, even while watching an ordinary broadcast TV program, to observe images taken by one of the surveillance cameras units #0–#2.

Although the whole arrangement is not illustrated in a separate drawing figure, the above warning generation device 30 may be additionally implemented in the RF converter circuit 11 as in the embodiment of FIG. 2, and be included in the booster power supply 5, so that commercially available ordinary cameras can be employed as the surveillance camera units #0–#2.

Although the preferred embodiments of the present invention have been described above, various modifications and changes may be made in the present invention without departing from the spirit and scope thereof.

According to the present invention, as described above, wiring for signal transmission and power supply can be simplified because the antenna lead-in wire the ordinary households have already been equipped with is used for the wiring of a signal transmission line through which video signals are transmitted and power is derived. The driving power for the surveillance camera is not relied upon a solar battery or secondary batteries but derived from the booster power supply, and thus the surveillance camera system and a transmitter therefor may be used in the shade, without requiring replacement of the secondary batteries, so that an inexpensive and maintenance-free transmitter for a surveillance camera system may be provided. Further, the transmitter for a surveillance camera system can be made available at much lower cost in comparison with a wireless system.

According to the present invention, a plurality of surveillance cameras can be connected to one or more television receivers, and thus images taken by each surveillance camera can be observed by switching channels of the television receivers.

Furthermore, even while watching an ordinary TV program, a user is notified of an approach of a trespasser or visitor, and thus can timely view images as necessary with ease just by switching channels.

According to the present invention embodied as a surveillance system, detection of an approach of a trespasser, a visitor or others can be made, for example, by an infrared sensor, and the filter circuit such as a low-pass filter is always ready to supply power (direct current) derived from a channel superposed in the antenna lead-in wire to the surveillance camera. Therefore, the power supply to the surveillance camera and the transmission of video signals from the surveillance camera to a household television receiver are enabled only when an approach of a trespasser, a visitor or others is detected by the sensor. Consequently, the surveillance system can be provided without using the costly image-processing techniques, and thus at low cost. Moreover, The transmitter for a surveillance camera system according to the present invention can be installed simply by establishing connection with the outdoor antenna lead-in wire provided across the outside and the inside of the house, and thus no work for making an extra hole in a wall of the house is necessitated.

What is claimed is:

1. A transmitter for a surveillance camera system, which transmits images taken by a surveillance camera to a television receiver, comprising:
   a power deriving circuit that derives driving power for the surveillance camera from an antenna lead-in wire; and
   a radio-frequency converter circuit that converts video signals generated from the images by the surveillance camera into radio-frequency signals, wherein the radio-frequency signals corresponding to the images taken by the surveillance camera are transmitted through the antenna lead-in wire to the television receiver.

2. A transmitter for a surveillance camera system according to claim 1, further comprising a video signal superposing/power deriving unit that includes the radio-frequency converter circuit and the power deriving circuit, wherein the video signal superposing/power deriving unit is provided separately from the surveillance camera; and
   wherein the video signal superposing/power deriving unit is connected with the surveillance camera and the antenna lead-in wire.

3. A transmitter for a surveillance camera system according to claim 1, further comprising a video signal superposing/power deriving unit that includes the radio-frequency converter circuit and the power deriving circuit, wherein the video signal superposing/power deriving unit is provided in the surveillance camera.

4. A transmitter for a surveillance camera system, which transmits images taken by a plurality of surveillance cameras to one or more of television receivers, comprising:
   a plurality of power deriving circuits that each derive driving power for corresponding one of the surveillance cameras from an antenna lead-in wire; and
   a plurality of radio-frequency converter circuits that each convert video signals generated from the images by corresponding one of the surveillance cameras into radio-frequency signals, wherein the radio-frequency signals corresponding to the images taken by each of the surveillance cameras are transmitted through the antenna lead-in wire to the television receivers;
   wherein radio-frequency signals from each surveillance camera are different in frequency band from those from every other surveillance camera, so that a different channel of the television receivers is assigned to the radio-frequency signals from each surveillance camera.

5. A transmitter for a surveillance camera system according to claim 4, further comprising a plurality of video signal superposing/power deriving units that each include the radio-frequency converter circuit and power deriving circuit each corresponding to one of the surveillance cameras, wherein the video signal superposing/power deriving units are provided separately from the surveillance cameras; and
   wherein the video signal superposing/power deriving units are connected with the corresponding surveillance cameras and the antenna lead-in wire.

6. A transmitter for a surveillance camera system according to claim 4, further comprising a plurality of video signal superposing/power deriving units that each include the radio-frequency converter circuit and power deriving circuit each corresponding to one of the surveillance cameras, wherein each video signal superposing/power deriving unit is provided in the corresponding surveillance camera.

7. A transmitter for a surveillance camera system according to claim 1, further comprising:

a detection unit that detects a significant change in a location under surveillance; and a notification unit that notifies a television viewer of detection of the significant change when the detection takes place.

8. A transmitter for a surveillance camera system according to claim 4, further comprising:

a plurality of detection units that each detect a significant change in a location under surveillance; and a plurality of notification units that each notify a television viewer of detection of the significant change when the detection takes place.

9. A video signal superposing/power deriving unit comprising:

a power deriving circuit that derives driving power for a surveillance camera from an antenna lead-in wire; and a radio-frequency converter circuit that converts video signals generated by the surveillance camera into radio-frequency signals, wherein the radio-frequency signals corresponding to the images taken by the surveillance camera are transmitted through the antenna lead-in wire to the television receiver.

10. A transmitter for a surveillance camera system according to claim 1 further comprising a power supply control circuit that permits power supply to the surveillance camera and transmission of radio-frequency signals to the television receiver when a significant change in a location under surveillance is detected.

11. A surveillance system comprising:

a surveillance camera that uses as driving power a direct current voltage derived by a filter circuit from an antenna lead-in wire to take images to be transmitted to a television receiver;

a radio-frequency converter circuit that converts video signals generated from the images by the surveillance camera into radio-frequency signals, wherein the radio-frequency signals corresponding to the images taken by the surveillance camera are transmitted through the antenna lead-in wire to the television receiver; and a power supply control circuit that permits power supply to the surveillance camera and transmission of radio-frequency signals to the television receiver when a significant change in a location under surveillance is detected.

12. A surveillance system according to claim 11, wherein the power supply control circuit includes:

a sensor circuit that detects a significant change in a location under surveillance;

a filter circuit that derives the direct current voltage from a channel superposed in the antenna lead-in wire and supplies same to the sensor circuit; and a switching circuit that starts the power supply to the surveillance camera and the transmission of radio-frequency signals to the television receiver when the sensor circuit detects a significant change in a location under surveillance.

13. A surveillance system comprising:

a plurality of surveillance cameras that each use as driving power a direct current voltage derived by a filter circuit from an antenna lead-in wire to take images to be transmitted to a television receiver;

a radio-frequency converter circuit that converts video signals generated from the images by the surveillance cameras into radio-frequency signals, wherein the radio-frequency signals corresponding to the images taken by the surveillance cameras are transmitted through the antenna lead-in wire to the television receiver;

a power supply control circuit that permits power supply to each of the surveillance cameras and transmission of radio-frequency signals to the television receiver when a significant change in each location under surveillance is detected; and a warning generation device that receives the radio-frequency signals, evaluates a level of radio-frequency signals for each channel corresponding to each of the surveillance camera, and generates a warning.

14. A surveillance system according to claim 13, wherein the warning generation device includes:

a signal level determination circuit that is provided for each channel to evaluate the level of the radio-frequency signals for the channel inputted through a filter provided for each level of the radio-frequency signals; and a warning generation circuit that is provided for each signal level determination circuit to generate a warning when radio-frequency signals having the level corresponding to the signal level determination circuit are inputted.

15. A surveillance system according to claim 13, wherein the warning generation device includes:

a signal level determination circuit that evaluates the level of the radio-frequency signals inputted through a variable frequency filter;

a channel scanning circuit that determines a channel corresponding to the level of the radio-frequency signals;

one or more of warning generation circuits that is provided for each channel to generate a warning when receiving the radio-frequency signals; and a selector that receives determination results of the signal determination circuit and the channel scanning circuit, and supplies the output of the signal determination circuit to at least one of the warning generation circuits corresponding are to the channel.

* * * * *